United States Patent [19]

Reda

[11] Patent Number: 5,394,752
[45] Date of Patent: Mar. 7, 1995

[54] METHOD FOR DETERMING SHEAR DIRECTION USING LIQUID CRYSTAL COATINGS

[75] Inventor: Daniel C. Reda, San Jose, Calif.

[73] Assignee: The United States of America as represented by the Administrator of the National Aeronautics and Space Administration, Washington, D.C.

[21] Appl. No.: 31,972

[22] Filed: Mar. 16, 1993

[51] Int. Cl.⁶ .................. G01B 11/16; C09K 19/00
[52] U.S. Cl. ........................ 73/800; 356/32
[58] Field of Search .................. 73/800; 356/32-35

[56] References Cited

U.S. PATENT DOCUMENTS

| | | | |
|---|---|---|---|
| 4,015,465 | 4/1977 | Scott | 73/800 |
| 4,124,404 | 3/1979 | Ogata et al. | 73/762 |
| 4,255,049 | 3/1981 | Sahm et al. | 356/32 |
| 4,270,050 | 5/1981 | Brogardh | 356/32 |
| 4,275,599 | 6/1981 | Kohlenberger et al. | 356/32 |
| 4,275,963 | 6/1981 | Primbsch | 356/35.5 |
| 4,353,649 | 10/1982 | Kashii | 73/800 |
| 4,655,589 | 4/1987 | Cestaro et al. | 356/35 |
| 4,667,095 | 5/1987 | Hatanaka et al. | 73/800 |
| 4,668,916 | 5/1987 | Pech | 324/456 |
| 4,774,835 | 10/1988 | Holmes | 73/147 |
| 4,781,455 | 11/1988 | Mächler et al. | 356/32 |
| 4,812,036 | 3/1989 | Inoue | 356/32 |
| 4,939,368 | 7/1990 | Brown | 73/800 |
| 5,070,729 | 12/1991 | Jensen | 73/147 |
| 5,270,781 | 12/1993 | Singh et al. | 356/32 |
| 5,309,767 | 5/1994 | Parmar et al. | 73/800 |

FOREIGN PATENT DOCUMENTS

| | | | |
|---|---|---|---|
| 0149836 | 7/1986 | Japan | 73/800 |
| 9111695 | 8/1991 | WIPO | 73/800 |

OTHER PUBLICATIONS

Klein, E. J., "Liquid Crystals in Aerodynamic Testing" Astronautics and Aeronautics, vol. 6, Jul. 1968, pp. 70–73.

"A New Method for Laminar Boundary Layer Transition Visualization in Flight-Color Changes in Liquid Crystal Coatings", NASA Technical Memorandum, 87666, Jan. 1986.

Primary Examiner—Richard E. Chilcot, Jr.
Assistant Examiner—George M. Dombroske
Attorney, Agent, or Firm—Kenneth L. Warsh; Guy M. Miller; Harry Lupuloff

[57] ABSTRACT

A method is provided for determining shear direction wherein a beam of white light is directed onto the surface of a liquid crystal coating to cause the white light to be dispersed (reflected) from the surface in a spectrum having bands of different colors in a fixed spatial (angular) sequence. The system is calibrated by locating a observer, e.g., a video and movie camera, such that a particular color band (preferably at or near the center of the reflected spectrum) is observed to thereby provide a reference color band. Because the application of shear causes either clockwise or counterclockwise rotation of the reflected spectrum dependent on the direction of the shear, a determination is then made of the reflected color band observed by the observer when the surface of the liquid crystal is subjected to shear to thereby determine the direction of the shear based on the directional (rotation) relation of the observed color band with respect to the reference color band in the spatial sequence of color bands.

17 Claims, 2 Drawing Sheets

METHOD FOR DETERMING SHEAR DIRECTION USING LIQUID CRYSTAL COATINGS

ORIGIN OF THE INVENTION

The invention described herein was made by an employee of the United States Government and may be manufactured and used by or for the Government for governmental purposes without the payment of any royalties thereon or therefor.

FIELD OF THE INVENTION

The present invention relates to aerodynamic testing using liquid crystals and more particularly to a method for determining the direction of surface shear stress in such testing.

BACKGROUND OF THE INVENTION

In fluid mechanics and aerodynamics research, much valuable information can be gained from visualizations of both the outer flow and surface shear stress patterns over solid bodies immersed in fluid streams. The liquid crystal coating method, i.e., a method wherein a liquid crystal coating is applied to a surface under test, is a diagnostic technique that can provide areal visualizations of instantaneous shear stress distributions on surfaces in dynamic flowfields with a response that is rapid, continuous and reversible. Reference is made, for example, to Klein, E. J., "Liquid Crystals in Aerodynamic Testing," Astronautics and Aeronautics, Vol. 6, July 1968, pp. 70–73.

Liquid crystals are highly anisotropic "fluids" that exist between the solid and isotropic liquid phases of some organic compounds. As such, these crystals exhibit optical properties characteristic of a crystalline (solid) state, while displaying mechanical properties characteristic of a liquid state. Typically, in flow-visualization applications, a mixture of one part liquid crystals to nine parts solvent (presently, Freon) is sprayed on the aerodynamic surface under study. A smooth, flat-black surface is essential for color contrast and must be kept free of grease and other chemical contaminants. Recommended applications (after spray losses) are about 10 to 20 ml liquid crystals, measured prior to mixing with the solvent, to each square meter of surface area. The solvent evaporates, leaving a uniform thin film of liquid crystals whose thickness, based on mass conservation and estimated spray losses, is approximately 10 to 20 $\mu$m (0.0004 to 0.0008 inch). Once aligned by shear, the molecules within the liquid crystal coating selectively scatter incident white light as a spectrum of discrete colors, with each color at a discrete angle (orientation) relative to the surface. For "thermochromic" liquid crystal compounds, this molecular structure, and thus the light scattering capability of the coating, responds to both temperature and shear stress. For newly-formulated, shear-stress-sensitive/temperature-insensitive compounds, such as Hallcrest BCN/192, "color play" (i e., discerned color changes at a fixed angle of observation, for a fixed angle of illumination) results solely from the application of shear stress.

While it is now known that this technique can be calibrated (under carefully controlled conditions) to measure surface shear stress magnitudes, two important issues remain: time response and "directional sensitivities," i e. sensitivity to illumination and viewing angles, as well as to the instantaneous shear stress direction.

The time-response issue has been investigated (see Parmar, D. S., "A Novel Technique for Response Function determination of Shear Sensitive Cholesteric Liquid Crystals for Boundary Layer Investigations," Review of Scientific Instruments, Vol. 62, No. 6, June 1991, pp. 1596–1608.) by placing a liquid crystal layer (about 100 $\mu$m thick) between two optical glass plates and applying known and transient shear forces via a displacement of one plate. Liquid crystal delay, rise and relaxation time constants were measured as a function of the monochromatic wavelength of the incident light. Time constants in the range of 10 to 100 milliseconds were generally observed, with minimum values being on the order of 3 milliseconds. The extrapolation (or applicability) of these results to actual fluid mechanic applications, wherein liquid crystal coating thicknesses are an order of magnitude less, remains an open question.

Another approach to characterizing the time-response and/or flow-direction-indication capabilities of the liquid crystal technique is to expose the coating to transient viscous flows of known time scales and/or known shear directions. Oscillating airfoil experiments provided some initial results concerning both issues (see Reda, D. C., "Liquid Crystals for Unsteady Surface Shear Stress Visualization," AIAA Paper 88-3841, July 1988 and Reda, D. C., "Observations of Dynamic Stall Phenomena Using Liquid Crystal Coatings," AIAA Journal, Vol 29, No. 2, February 1991, pp. 308–310.)

In general, while previous investigators have utilized the liquid crystal technique, the focus of such research has been on attempting to determine parameters related to the magnitude of shear stress, for example the sudden increase in shear stress levels at the transition from laminar to turbulent flow. Reference is made, for example, to U.S. Pat. No. 4,774,835 (Holmes) and to Holmes et al, "A New Method for Laminar Boundary Layer Transition Visualization in Flight-Color Changes in Liquid Crystal Coatings," NASA Technical Memorandum, 87666, January 1986.

SUMMARY OF THE INVENTION

In accordance with the invention, a method is provided which enables the direction of shear stresses to be determined using liquid crystal coatings and which has a response time on the order of 1 millisecond so as to enable detection of changes in shear direction that take place very rapidly.

As discussed above, the white light dispersed from the liquid crystal coating is a spectrum of discrete color bands, with each color band arranged at a discrete angle or angular orientation with respect to the test surface. The present invention is based on the discovery or inventive appreciation that when the liquid crystal coating is subjected to shear (e.g., by a wind tunnel flow over the surface of the liquid crystals), these color bands will rotate, i.e., shift angularly in either a clockwise or counterclockwise direction. By locating the observer (normally a high speed movie camera or a video camera) in a fixed reference position (e.g., mid-spectrum so as to observe the central (e.g., green) color band of the reflected spectrum) the direction of the rotation of the spectrum produced under the application of shear stresses can be determined by determining the color then observed by the observer (e.g., blue if the spectrum rotation is counterclockwise and yellow if the rotation is clockwise). If the detected rotation is counterclockwise the shear direction is to the right, and if clockwise, the direction is to the left. It is noted that in an actual wind tunnel test, the shear can change in one-thousandths of a second so that as discussed above, the observer is normally non-human.

Other features and advantages of the invention will be set forth in, or apparent from, the following detailed description of a preferred embodiment.

DESCRIPTION OF THE PREFERRED EMBODIMENTS

Figure 1:
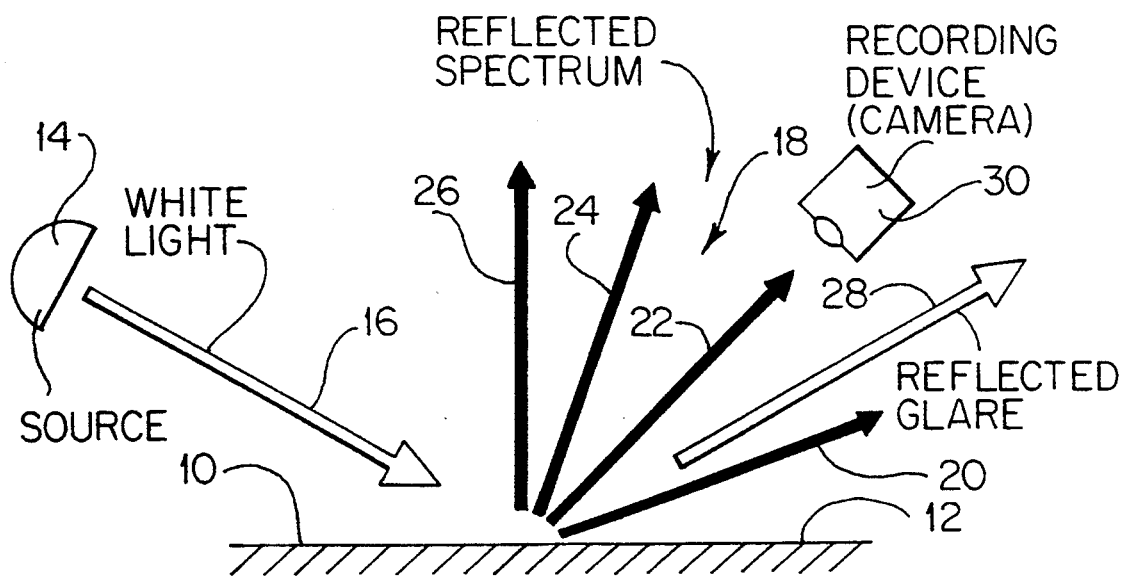
FIG. 1 is a schematic representation of the dispersed (reflected) light spectrum produced by directing a beam of white light obliquely onto a surface coated with an aligned liquid crystal layer.

Referring to FIG. 1, a schematic representation is provided of the "color play" provided by a liquid crystal coating. In FIG. 1, an aligned liquid crystal coating 10 is provided on a black surface 12 beneath coating 10, and a source 14 produces a beam of white light indicated at 16. The reflected spectrum 18 from coating 10 comprises, as discussed above, a series of discrete colors or color bands. More specifically, in the schematic representation provided in FIG. 1, these bands comprise a blue (turquoise) band 20, a green band 22, a yellow band 24 and a red band 26, and these bands are produced in addition to a reflected glare line indicated 28. An observer, in the form of a recording device 30 comprising a movie and/or video camera, is positioned near "mid-spectrum," i.e. just before the yellow-to-green transition angle so that the observer sees the green band 22. In this simplest of all possible arrangements, the light, camera and flow direction are all in the same plane. The technical paper "*Experimental Investigations of the Time and Flow-Direction Responses of Shear-Stress-Sensitive Liquid Crystal Coatings,*" D.C. Reda, J. J. Muratore, Jr., and J. T. Heineck, AIAA Paper No. 93-0181, which is hereby incorporated by reference, describes calibration procedures for more complex experimental arrangements of the present invention.

Figure 2A:
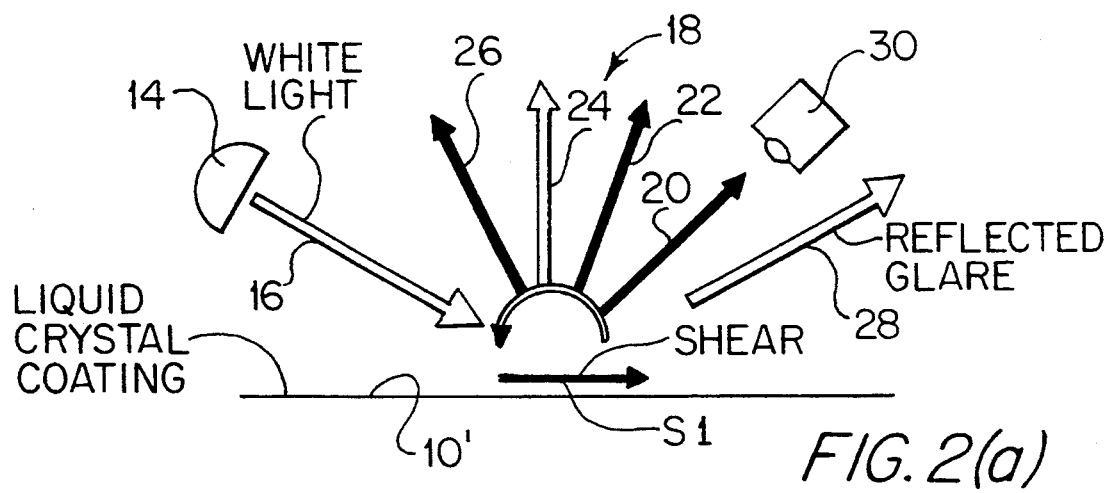
FIG. 2(a) and 2(b) are views corresponding to that of FIG. 1 showing the rotation of the reflected light spectrum in response to shear stresses imparted to the liquid crystal coating in respective opposite directions.
Figure 2B:
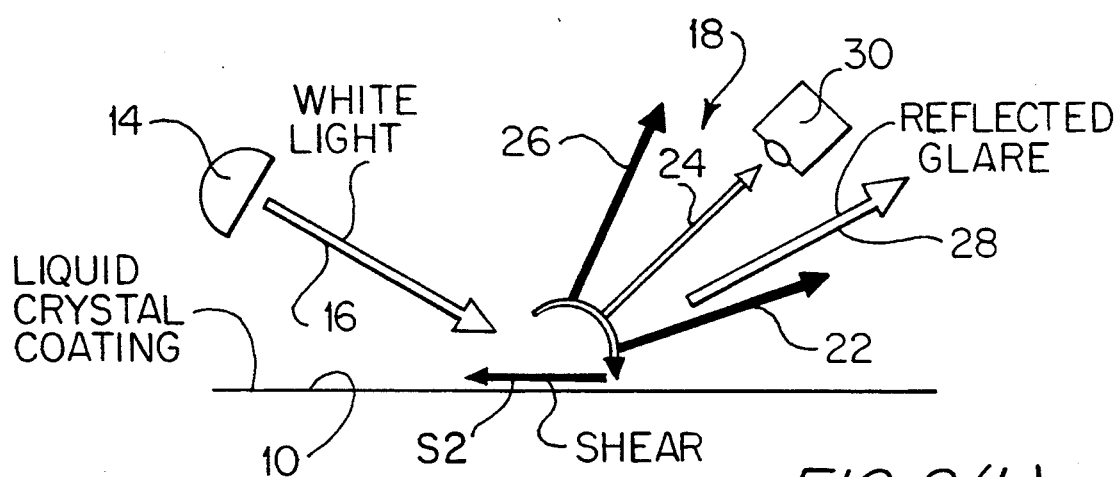

Referring to FIGS. 2(a) and 2(b), there are shown schematic representations similar to that of FIG. 1, illustrating the spectrum rotations produced by the application of shear stresses. In particular, FIG. 2(a) depicts a situation wherein shear, i.e., shear stress, indicated by arrow S1, is exerted from left to right and as illustrated, under these circumstances the reflected spectrum 18 rotates counterclockwise so that the blue band 20 is viewed or observed by camera 30 instead of the green band as in FIG. 1. In contrast, 2(b) illustrates a situation wherein shear, indicated by arrow S2, is exerted from right to left and illustrates the fact that the spectrum 18 rotates clockwise and the yellow band 24 is viewed by recording device 30. Thus, it will be appreciated from the foregoing that by determining the color band observed by the observer (recording device) 30, a determination can be made of the direction of the shear applied to the liquid crystal coating 10.

Figure 3:
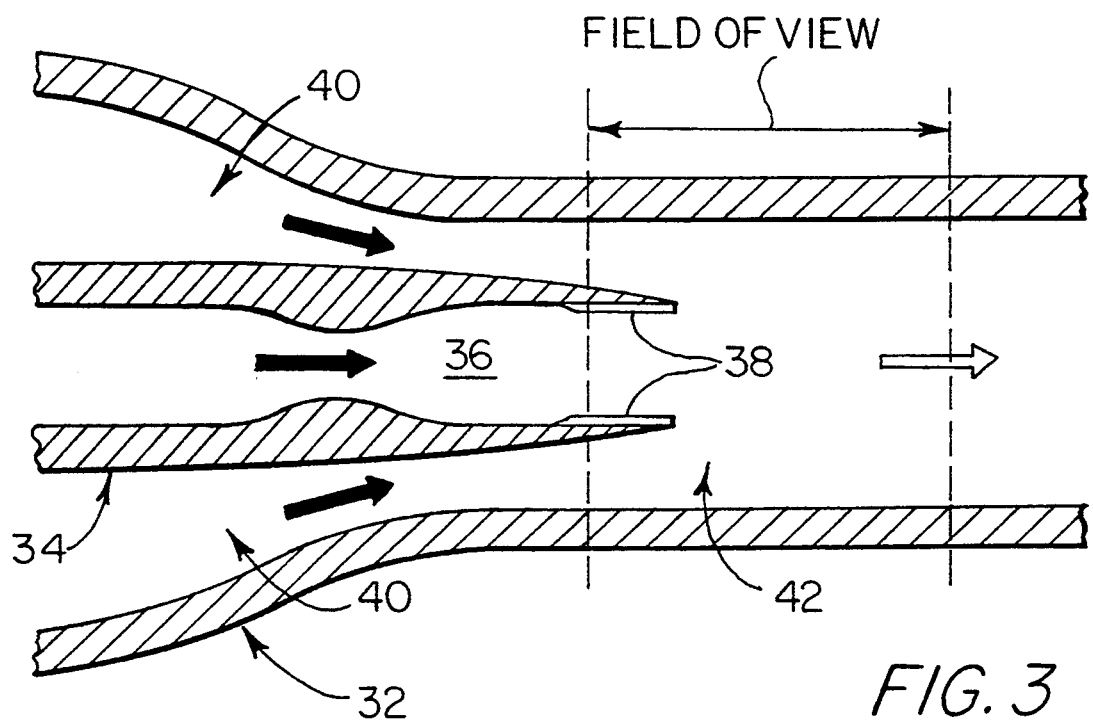
FIG. 3 is a schematic longitudinal cross section view of a wind tunnel test facility used in demonstrating or testing the method of the invention.

Turning now to some specific examples of aerodynamic testing employing the method of the invention, a coating of newly-formulated, shear-stress-sensitive and temperature-insensitive liquid crystal compound, Hallcrest BCN/192, was exposed to transient, compressible flows created during the startup and off-design operation of an injection driven supersonic wind tunnel which is shown schematically in FIG. 3. The wind tunnel, which is generally denoted 32, includes a nozzle 34 having a test section 36 with a diffuser 38 therein, as well as surrounding injectors 40. A supersonic mixing chamber 42 is located downstream of nozzle 34 and injectors 40 and upstream of second stage injectors and a vacuum system (not shown), and a field of view is provided in the area of supersonic mixing chamber 42 as indicated in FIG. 3.

In a facility corresponding to that shown in FIG. 3, supersonic injector flows ($P_o = 1$ atm, $M = 2.4$, $Re = 3 \times 10^6/ft$), emanating from above and below the supersonic exit of diffuser 38 were used to "drag" the primary flow through the nozzle 34 ($P_o - 0.35$ atm, $M - 2.5$, $Re = 10^6/ft$). The three merged streams then flowed to a downstream reservoir (not shown) maintained at 0.55 atm by a vacuum compressor. Transient flowfield events (unsteady shock wave/boundary layer interactions and supersonic shear layer unsteadiness) responsible for generating transient surface shear stress distributions on the tunnel sidewall (within the field of view delineated in FIG. 3) were documented in precursor experiments using a focussing Schlieren system and a high-speed video camera (to 1000 frames/sec). Observable transients of time scales $\leq 1$ millisecond were found to be present.

For the liquid crystal experiments, one sidewall window of tunnel 32 was removed and replaced with a solid (black) flush-mounted metal insert, which became the test surface, and which corresponds to the black backing 12 of FIG. 1. The visible surfaces beneath the three separate streams, and the surface area within the mixing region immediately downstream of the injector/diffuser exit plane, were obliquely illuminated by white light from the downstream direction as discussed above. The angle of illumination was about 45° from the sidewall plane as shown in FIGS. 1 to 3.

Initial attempts at viewing and recording the liquid crystal color-play response were made on a line of sight perpendicular to the test surface. Under these conditions, essentially no color play could be observed; the test surface appeared black, i.e., the coating "cleared" under the application of shear. Post-test observations of the shear-aligned liquid crystal coating showed that the spectrum of scattered light (under no-shear conditions) came off the surface starting with red corresponding to band 26 of FIG. 1 on the normal, followed by yellow (band 24) at an angle of about 30° from normal, green (band 22) at an angle of about 45° from normal, followed by "reflected glare" (glare line 28), at about 45°, and then turquoise or light bluish green (band 20) "inside" the reflected glare line.

For subsequent experiments, the recording devices (movie and/or video cameras corresponding to recording device 30) were positioned near "mid-spectrum," i.e., just before the yellow-to-green transition angle as discussed above. Using this camera-alignment procedure, the dynamic surface shear stress patterns on the tunnel sidewall were rendered visible in a most informative manner.

Flow transients and liquid crystal coating color-play response were recorded using an NAC Visual Systems HSV-1000 high speed color video system. Liquid crystal coating response time was thus documented to be equal to, or less than, the time interval between sequential frames recorded at 1 kHz, i.e., 1 millisecond.

Results obtained during these experiments also showed that when the nozzle flow was maintained at a total pressure just below the established "minimum run" value of about 0.35 atm, random unstarts and restarts of the supersonic diffuser flowfield would occur. In such instances, the shock pattern in and downstream of the diffuser 38, and the shear layer lateral extent within the mixing region, would all abruptly change. During these highly transient events, the liquid crystal color seen on the diffuser sidewall would also abruptly change from green to red, then red back to green. Under no-shear conditions, corresponding to those shown in FIG. 1, these two wavelengths of light had angular orientations on "opposite sides" of the recording device as shown in FIG. 1.

Under steady-state run conditions, reverse flows were known to exist on the supersonic diffuser sidewalls beneath the shock wave/boundary layer interaction region. During momentary unstarts, high-velocity subsonic/attached flows formed, thereby abruptly changing both the shear stress magnitude and direction (by 180°). It was determined that the sense of the angular displacement of the liquid crystal spectrum relative to a fixed observer was linked to the instantaneous direction of the shear stress "vector" acting on the coating.

Figure 4A:
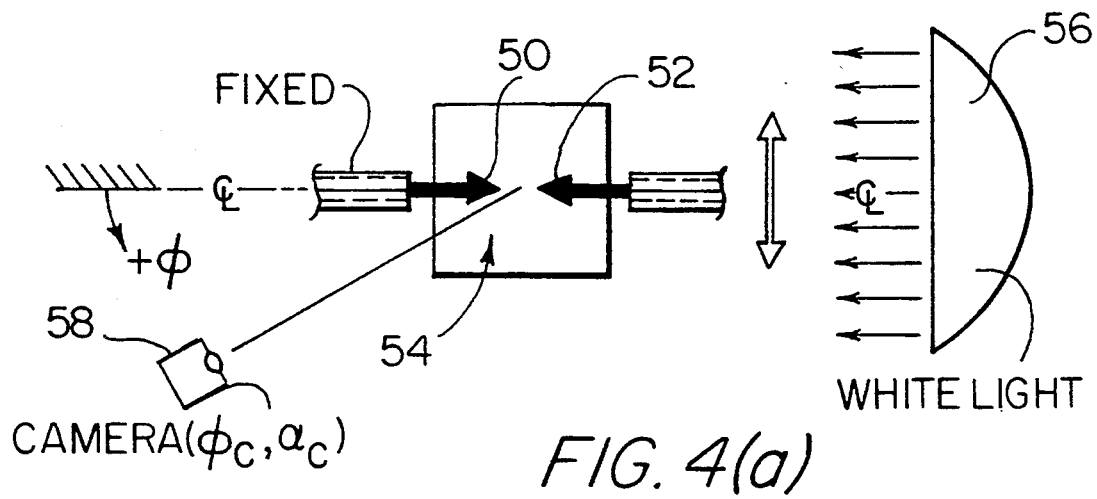
FIGS. 4(a) and 4(b) are schematic top plan and side elevational views, respectively, of a further test setup used in demonstrating the method of the invention.
Figure 4B:
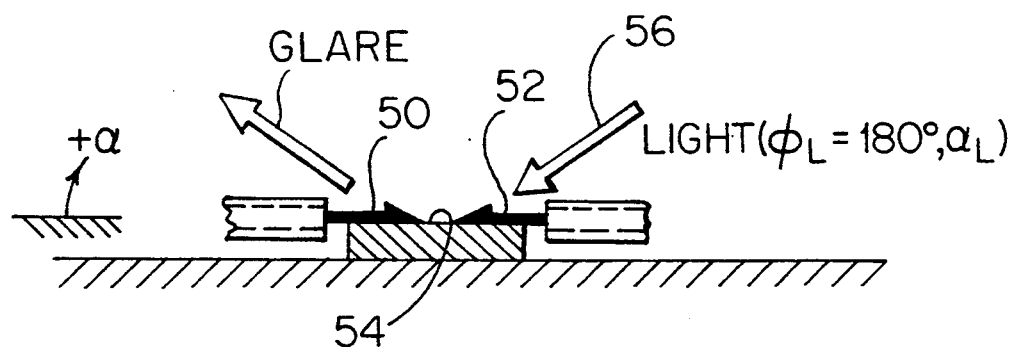

In a simple "bench-top" experiment, two shear stress "vectors" of the same magnitude, but with opposing directions, were simultaneously imposed on a liquid crystal coating using the test set-up shown in FIG. 4(a) and FIG. 4(b). This was accomplished by feeding two identical subsonic jets, indicated at 50 and 52 from a common reservoir (not shown) of adjustable pressure. The two jets 50 and 52 were then blown tangentially across a planar test surface 54 in opposite directions, and the transverse position of one adjusted until the centerlines of the two jets were exactly aligned. The planar test surface had a liquid crystal coating thereon and white light indicated at 56 was directed onto the test surface 54 and a camera 58 used to record the reflected light, as shown. These "color-play"0 experiments were undertaken at the following test and recording conditions:

JET TOTAL PRESSURES=0.5 psig.
LIGHTING ANGLE=$\phi_L$=180°, $\alpha_L$=25°
CAMERA ANGLES; $\phi_c$=±55°, $\alpha_c$=30°

For the shallow lighting angle used herein ($\alpha_L$=25°), the camera angle ($\alpha_c$=30°) corresponded to a yellowish-green "mid-spectrum" color under no-shear conditions. Recording out of the flow/lighting plane (at $\phi_c$=±55°) avoided the reflected glare problem but did not change the principal conclusion, i.e., that the sense of the angular displacement is a function of the instantaneous shear stress direction acting on the liquid crystal coating. Equal but opposite shear stress vectors yielded two distinctly different colors, reddish-brown for flow toward the light and turquoise for flow away from the light. The same result was obtained on "the other side" of the flow/lighting plane, at $\phi_c$=×55°. Thus, as discussed above and as indicated in the lighting/shear plane, the reflected liquid crystal spectrum rotates towards the local "upstream" direction, i.e., towards the "tail" of the surface shear stress vector.

It will be understood by those skilled in the art that although the invention has been described relative to exemplary preferred embodiments thereof, variations and modifications can be effected in these embodiments without departing from the scope and spirit of the invention.

What is claimed is:

1. A method for determining shear direction, said method comprising:
   providing a liquid crystal coating having a surface;
   directing a beam of white light onto the surface of the liquid crystal coating to cause said white light to be dispersed from said surface in a spectrum having bands of different colors in a fixed spatial sequence;
   providing calibration by locating an observer such that a particular color band is observed to thereby provide a reference color band;
   determining the reflected color band observed by the observer when the surface of the liquid crystal is subjected to shear; and
   determining the direction of said shear based on the directional relation of the observed color band with respect to said reference color band in the spatial sequence of color bands.

2. A method as claimed in claim 1 wherein the calibration step comprising locating an observer near the middle of the spectrum of the reflected white light when no shear is applied to the liquid crystal coating.

3. A method as claimed in claim 2 wherein the calibration step comprising locating the observer so that a green band in the spectrum is observed by the observer.

4. A method as claimed in claim 1 wherein said liquid crystal coating is applied to a black background surface.

5. A method as claimed in claim 1 wherein the angle of said beam of white light relative to the surface of the coating is oblique.

6. A method as claimed in claim 1 wherein said color bands are observed using a recording device.

7. A method as claimed in claim 6 wherein said recording device comprises a movie camera.

8. A method as claimed in claim 6 wherein said recording device comprises a video camera.

9. A method of determining the direction of shear stresses imparted to a liquid crystal coating by subsonic or supersonic fluid flows past the surface of the coating, said method comprising:
   directing a beam of white light at an oblique angle with respect to the surface of the liquid crystal coating so as to cause said white light to be reflected from said surface in a color spectrum comprising bands of different colors at different angular positions in a fixed angular sequence;
   calibrating the method by arranging an observer at a selected acute angle with respect to the surface of the coating and determining the color band observed by the observer at that angle under conditions wherein no shear stresses are applied to the coating to thereby establish a reference color band;
   determining the reflected color band observed by the observer at said selected acute angle when shear stresses are imparted to the surface of the liquid crystal coating; and
   determining the direction of said shear stresses based on the rotational direction of the observed color band relative to the reference color band.

10. A method as claimed in claim 9 wherein the calibration step comprising locating an observer near the middle of the spectrum of the reflected whitelight when no shear stresses are applied to the liquid crystal coating.

11. A-method as claimed in claim 10 wherein the calibration step comprising locating the observer so that a green band in said spectrum is observed by the observer.

12. A method as claimed in claim 9 wherein said liquid crystal coating is applied to a black background surface.

13. A method as claimed in claim 9 wherein the angle of said beam of white light relative to the surface of the coating is 25°.

14. A method as claimed in claim 9 wherein said color bands are observed using a recording device.

15. A method as claimed in claim 14 wherein said recording device comprises a movie camera.

16. A method as claimed in claim 14 wherein said recording device comprises a video camera.

17. A method of determining the direction of shear stresses imparted to a liquid crystal coating by supersonic injector flow past the surface of the coating in a wind tunnel facility, said method comprising:

directing a beam of white light at an oblique angle with respect to the surface of the liquid crystal coating so as to cause said white light to be dispersed from said surface in a color spectrum comprising bands of different colors at different angular positions in a fixed sequence comprising blue, green, yellow and red bands;

calibrating the method by arranging a observer at a selected acute angle with respect to the surface of the coating so that the green color band is observed by the observer at that angle under conditions wherein no shear stresses are applied to the coating; and determining whether the reflected color band observed by the observer at said selected acute angle when shear stresses are imparted to the surface of the liquid crystal coating is (i) a blue band indicating counter-clockwise rotation of the spectrum and that the shear direction is to the right or (ii) is a yellow or red band indicating clockwise rotation of the spectrum and that the shear direction is to the left, so as to thereby determine the direction of said shear stresses based on the rotational direction of the observed color band relative to the green color band.

* * * * *